R. W. NICOL.
CHILD'S TOY.
APPLICATION FILED DEC. 31, 1910.
1,005,285.
Patented Oct. 10, 1911.
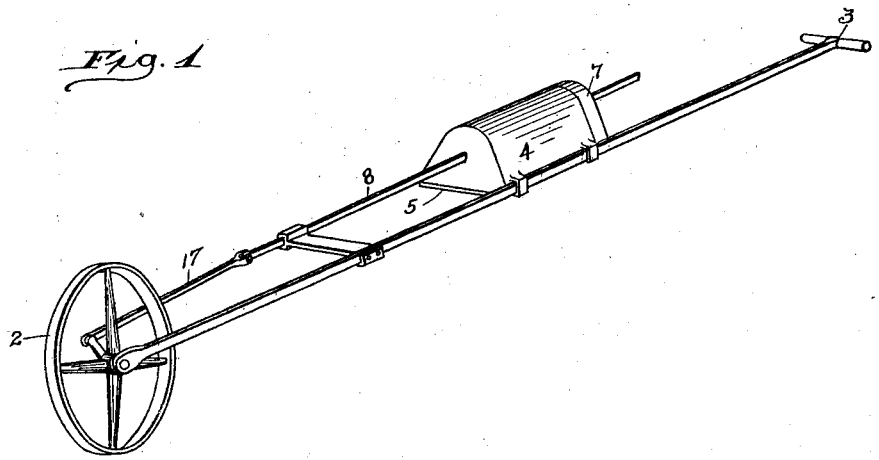
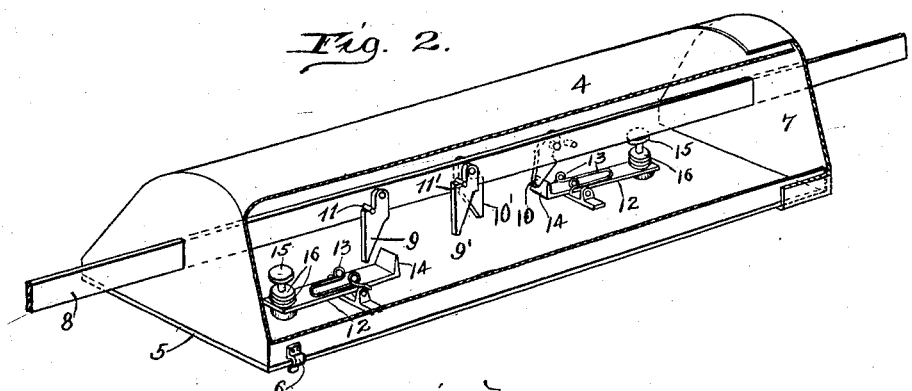
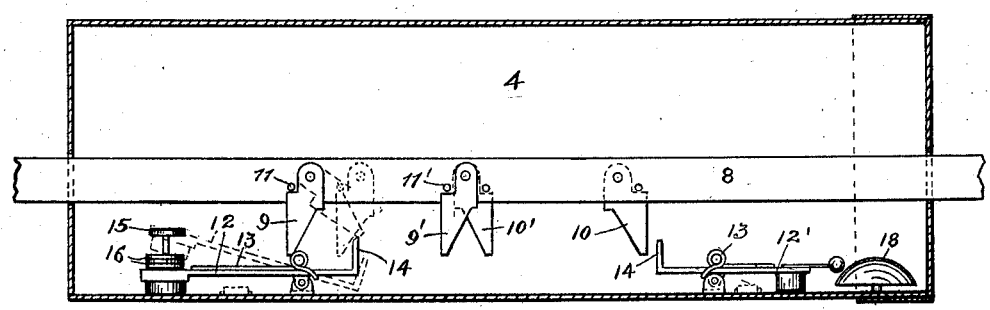
Witnesses:
Chas. E. Gorton
M. LaVelle.
Inventor:
Richard W. Nicol
By Joseph G. Parkinson
Atty

UNITED STATES PATENT OFFICE.

RICHARD W. NICOL, OF CHICAGO, ILLINOIS.

CHILD'S TOY.

1,005,285. Specification of Letters Patent. Patented Oct. 10, 1911.

Application filed December 31, 1910. Serial No. 600,335.

*To all whom it may concern:*

Be it known that I, RICHARD W. NICOL, a citizen of the United States, and a resident of Chicago, in the county of Cook and State of Illinois, have invented certain new and useful Improvements in Children's Toys, of which the following is a specification.

My invention relates to a device in the nature of a barrow which, as it is driven, or moved back and forth, actuates sounding apparatus of a nature to please the child driving it; and it consists, primarily, in a wheel and handle light enough to be trundled by a child with one hand, a sounding box carried by the handle, sounding apparatus within said box, a reciprocating bar playing through said box and actuating the sounding apparatus, and connections between the wheel and said bar whereby the bar is actuated.

It consists further in various modifications and details of construction hereinafter pointed out and embraced in the claims.

In the drawings: Figure 1 is a perspective view of apparatus embodying my invention; Fig. 2, a perspective view of the sounding box, enlarged, with one side broken away to expose the sounding apparatus within, in this instance calculated to beat a ruff; Fig. 3, a vertical, longitudinal section through said sounding box, showing at the right-hand end how a bell may be substituted for the above mentioned particular sounding apparatus.

Referring now to said drawings, the numeral 2 indicates the wheel, only one being necessary for the purpose, and 3 is the handle, which may be a straight stick, having bearings for the wheel. Secured to the handle, about midway of its length, is a sounding box 4 of suitable outline, herein shown as semicylindrical, with a flat bottom 5, which may be hinged to the upper portion and locked up thereagainst by a catch 6, or other suitable means. The lower end of this sounding box is closed permanently while a removable cap 7 takes over the upper end and serves to lock the bottom in case the latter is hinged, as to its corresponding end.
A reciprocating bar 8 passes longitudinally through the sounding box, being inserted through a suitable guide aperture in the lower end thereof and also through one in the cap. The cap is removable chiefly with the purpose of properly fitting it to the bar, which can not readily be done unless it is off the box and capable of being manipulated. The bar carries tripping dogs, 9, 9¹, 10, 10¹, the first two of which are pivoted on one side and made rigid in one direction by stops 11, 11¹, while free to move on their pivots in the other direction. The second pair of dogs, pivoted on the other side of the bar, are stayed by stops in a similar manner, but are rigid in a reverse sense from the first.

The bottom or floor of the sounding box is preferably made of zinc, although its material will be determined by circumstances, while its body will be of any suitable substance adapted to promote resonance, eliminate harshness and improve the timbre. In the preferred form of my invention, the one that beats a sort of ruff, two keys 12 are pivoted to this floor and urged thereagainst at their hammer ends by springs 13 suitably secured to the floor. One of these keys is arranged to one side of the reciprocating bar, and the other to the opposite side, and the trip end of each key, 14, stands up in the path of the tripping dogs on the respective sides of said bar, so that as the bar moves to and fro the dogs strike the trip ends and lift the keys at their hammer ends and immediately release them, the dogs at one side of the bar actuating their key when going and the dogs at the other side actuating theirs when coming. Thus a continuous ruff will be played by the keys against the floor, by the hammer ends of the keys. To increase the effect a spindle 15 may stand up from one or both of the hammers and several loose metallic disks 16 may be strung upon this spindle, giving a sort of jingle as the hammer strikes.

The sounding box, being closed and wholly inclosing the comparatively delicate sounding apparatus, serves a secondary but important function in addition to its primary one, that is, it shields and protects said apparatus from the inquisitive and destructive fingers of a frisky child and from the rough knocks to which it would otherwise be exposed.

The reciprocating bar is actuated by a pitman-connection 17 with the wheel, as shown, so that when the device is trundled over floor or side walk there will be a continuous sounding of the apparatus.

At one end of Fig. 3 I have shown how bells or gongs 18 may be employed in connection with a modified form of keys, adapted to act as strikers, $12^1$, and actuated by the same reciprocating bar and its dogs. This construction will probably be more pleasing to little girls than the one above described which suits itself more especially to a boy's nature.

It will be understood that I do not limit myself to any particular construction of barrow, the only requisite being that it should be sufficiently light to be trundled by a child; nor do I limit myself to any particular shape of sounding box or means for actuating the sounding apparatus therein; nor to the nature of said sounding apparatus, or the character and quality of sound produced thereby; but

What I claim as my invention and desire to secure by Letters Patent of the United States is:

1. A children's toy, comprising a light barrow, a closed sounding box of resonant material suitably located on said barrow, sounding apparatus inclosed within said box, and means for operating said sounding apparatus from the wheel of said barrow as the latter is trundled.

2. A children's toy, comprising a light barrow, a sounding box suitably located on said barrow, sounding apparatus within said box, a bar reciprocating through the box having means to actuate the sounding apparatus, and a pitman-connection between said bar and the wheel of the barrow.

3. A children's toy, comprising a light barrow, a sounding box suitably located on said barrow, sounding keys within said box, a reciprocating bar moving through said box, tripping dogs carried by said bar to actuate the keys to beat a ruff, and a pitman-connection between the wheel of the barrow and the end of said bar.

4. A children's toy, comprising a light barrow, a semi-cylindrical, flat bottomed sounding box suitably located on said barrow, sounding keys pivoted to said flat bottom and having a hammer end and a trip end, springs pressing the hammer ends down, a bar reciprocating through said box, dogs pivoted to opposite sides of said bar to actuate said keys arranged on the respective sides, one key being actuated in the going and the other in the coming of the bar, and a pitman-connection between said bar and the wheel of the barrow.

5. A children's toy, comprising a light barrow, a closed sounding box carried on the handle of said barrow, sounding apparatus within said box, and means for operating the sounding apparatus from the wheel of the barrow as the latter is trundled.

6. The combination of the sounding box, the sounding apparatus therein, the reciprocating actuating bar playing through said box, means on said bar for operating said apparatus, and the apertured detachable cap for receiving the upper end of the bar and closing the upper end of said box.

7. The combination of the sounding box having detachable cap at its upper end and hinged flat bottom, the sounding keys hinged to said bottom, the springs depressing their hammer ends, and the reciprocating trip-bar playing through the lower end of the box and the detachable cap at the upper end.

R. W. NICOL.

Witnesses:
 JOSEPH G. PARKINSON,
 MARY LA VELLE.

---

Copies of this patent may be obtained for five cents each, by addressing the "Commissioner of Patents, Washington, D. C."